United States Patent
Deguillaume

(10) Patent No.: US 12,493,889 B2
(45) Date of Patent: Dec. 9, 2025

(54) METHOD AND A SYSTEM FOR SERIALIZATION OF ITEMS, AND RECOVERING DATA FROM SERIALIZED ITEMS

(71) Applicant: SICPA HOLDING SA, Prilly (CH)

(72) Inventor: Frédéric Deguillaume, Geneva (CH)

(73) Assignee: SICPA HOLDING SA, Prilly (CH)

( * ) Notice: Subject to any disclaimer, the term of this patent is extended or adjusted under 35 U.S.C. 154(b) by 202 days.

(21) Appl. No.: 18/014,843

(22) PCT Filed: Jul. 6, 2021

(86) PCT No.: PCT/EP2021/068637
§ 371 (c)(1),
(2) Date: Jan. 6, 2023

(87) PCT Pub. No.: WO2022/008501
PCT Pub. Date: Jan. 13, 2022

(65) Prior Publication Data
US 2023/0274288 A1 Aug. 31, 2023

(30) Foreign Application Priority Data
Jul. 6, 2020 (EP) .................................... 20184126

(51) Int. Cl.
*G06Q 30/018* (2023.01)
*H04L 9/06* (2006.01)

(52) U.S. Cl.
CPC ....... *G06Q 30/0185* (2013.01); *H04L 9/0618* (2013.01); *H04L 9/0668* (2013.01); *G06Q 2220/00* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 5,490,216 A | * | 2/1996 | Richardson, III | G06Q 30/04 705/56 |
| 5,758,068 A | * | 5/1998 | Brandt | G06F 21/10 726/30 |

(Continued)

FOREIGN PATENT DOCUMENTS

| | | | | |
|---|---|---|---|---|
| JP | 2009080898 A | * | 4/2009 | .......... H04L 63/126 |
| WO | WO-2004045185 A1 | * | 5/2004 | ............ H04L 63/08 |
| WO | 2018204319 | | 11/2018 | |

OTHER PUBLICATIONS

• Serg. "Serial Number System Challenge." (Jan. 1, 2016). Retrieved online Sep. 24, 2024. https://sergworks.wordpress.com/2016/01/01/serial-number-system-challenge/ (Year: 2016).*

(Continued)

*Primary Examiner* — James A Reagan
(74) *Attorney, Agent, or Firm* — Muncy, Geissler, Olds & Lowe, P.C.

(57) ABSTRACT

A method for serialization of items, comprising encrypting a serial number of each item using an encryption key k to obtain unique serial numbers and marking the unique serial numbers on the items. The unique serial numbers having a length L are included into a string of symbols having a length L', with L' larger than L, and marked on the items. A corresponding method for recovering a unique code and corresponding serial number from a string of symbols marked on an item, as well as corresponding serialization and recovering systems are disclosed.

13 Claims, 12 Drawing Sheets

(56) References Cited

U.S. PATENT DOCUMENTS

| | | | | |
|---|---|---|---|---|
| 6,799,187 | B2* | 9/2004 | Beggs | G06Q 10/06 |
| 7,246,246 | B2* | 7/2007 | Kupka | G06F 21/10 |
| | | | | 713/189 |
| 7,752,137 | B2* | 7/2010 | Dillon | G06Q 30/06 |
| | | | | 726/32 |
| 7,835,520 | B2* | 11/2010 | Kumar | H04N 21/4108 |
| | | | | 380/202 |
| 8,738,917 | B2* | 5/2014 | Wakao | H04N 1/32101 |
| | | | | 713/176 |
| 9,038,886 | B2* | 5/2015 | Hammad | G06Q 20/12 |
| | | | | 235/375 |
| 9,208,459 | B2* | 12/2015 | Fung | G06Q 10/04 |
| 9,582,686 | B1* | 2/2017 | Langhammer | G06F 21/72 |
| 2003/0120416 | A1* | 6/2003 | Beggs | G06Q 10/06 |
| | | | | 701/100 |
| 2003/0221113 | A1* | 11/2003 | Kupka | G11B 20/00195 |
| | | | | 713/189 |
| 2005/0097054 | A1* | 5/2005 | Dillon | G06Q 10/08 |
| | | | | 705/51 |
| 2006/0248348 | A1* | 11/2006 | Wakao | H04N 1/32101 |
| | | | | 713/186 |
| 2008/0120129 | A1* | 5/2008 | Seubert | G06Q 40/125 |
| | | | | 705/305 |
| 2010/0293382 | A1* | 11/2010 | Hammad | H04L 9/3234 |
| | | | | 713/172 |
| 2011/0063093 | A1* | 3/2011 | Fung | G06Q 50/04 |
| | | | | 340/10.52 |
| 2012/0256732 | A1* | 10/2012 | McAllister | B65C 11/006 |
| | | | | 340/10.2 |
| 2015/0348056 | A1* | 12/2015 | Surapaneni | G06Q 30/018 |
| | | | | 705/317 |
| 2017/0032381 | A1* | 2/2017 | Vaidyanathan | G06Q 30/0185 |
| 2020/0082396 | A1* | 3/2020 | Chow | G06Q 20/1085 |
| 2020/0358751 | A1* | 11/2020 | Bansal | H04L 9/083 |
| 2021/0350197 | A1* | 11/2021 | Chow | G06Q 20/3829 |

OTHER PUBLICATIONS

• Stack Exchange. "Understanding Key Serial Numbers (KSN) in Derived Unique Key Per Transaction (DUKPT)." (Jul. 1, 2016.) Retrieved online Sep. 24, 2024. https://security.stackexchange.com/questions/92815/understanding-key-serial-numbers-ksn-in-derived-unique-key-per-transaction-du (Year: 2016).*

Counterfeit Prevention et al: "General Presentation", Jan. 1, 2016 (Jan. 1, 2016), URL:https://web.archive.org/web/20201104155413/https://www.slideshare.net/EddieCohen1/6dcp-presentation-2016 (Slides 16 and 17), 47 pages.

Emil Stefanov et al: "FastPRP: Fast Pseudo-Random Permutations for Small Domains", IACR, International Association for Cryptologic Research, vol. 20120615:160224, Jun. 15, 2012 (Jun. 15, 2012), pp. 1-10.

International Search Report; Written Opinion and International Preliminary Report on Patentability issued with respect to application No. PCT/EP2021/068637 (Sep. 24, 2024).

* cited by examiner

Fig. 10

METHOD AND A SYSTEM FOR SERIALIZATION OF ITEMS, AND RECOVERING DATA FROM SERIALIZED ITEMS

TECHNICAL FIELD

The present invention relates to the technical field of secure coding of items to enable their identification, authentication, as well as tracking and tracing, in particular to a method for serialization of items and a corresponding system for serialization thereof.

BACKGROUND ART

Over the years counterfeiting of consumer goods, in particular pharmaceutical products, has become a huge problem resulting in a great number of low-quality dangerous products on the markets worldwide and considerable losses in revenues for the manufacturers.

The current solutions to address the problem of counterfeiting involve an item serialization and/or label serialization, which consists in printing unique codes on a succession of products, packages, stamps, etc., in order to be able to identify each individual product uniquely. Generally, a code is a sequence of symbols like, e.g., glyphs, characters, numbers, resulting from an encryption of a unique (serial) number associated with an item. This unique serial number in fact specifies a rank of the item within a given series of items (e.g. the rank of an item in a production line), in that perspective a serial number corresponds to an ordinal number. A main goal of encryption of such unique serial numbers is to conceal the actual ordering of the items in order to prevent a counterfeiter to easily guess a plausible sequence of serial numbers (corresponding to successive items).

For example, WO2018204319A1 describes tracking and authentication of products, such as pharmaceutical tablets and other elements stared in blisters or similar packaging, to verify the authenticity thereof. A product sequence defined by physical attributes and locations of pharmaceutical products in the packaging is encrypted and used to mark the packaging with a coding.

Normally serialization does not have synchronization issue, each product/item/label receiving one unique code, using the proper trigger or encoder. Usually misprinted products can be automatically ejected from the line. Such classical serialization works fine only when each item is strictly marked with its unique code with no error.

However, in some circumstances linear desynchronizations may occur, i.e. the codes are misregistered (not correctly synchronized) within the items, resulting in codes being split apart between consecutive items, so that one item can have the end of the previous code concatenated with the beginning of the following code. In this case, classical serialization cannot decrypt the code to find a correct serial number. Linear misregistering can occur due to various technical reasons, such as applying of pre-marking on a foil which is subsequently cut without strict control of the position of cuts when being applied on items. For example, the serialization numbers of a batch of items can be printed in sequence on a continuous strip (generally of paper), and are subsequently cut into pieces of length corresponding to a code length to be applied on items: due to possible offset at cutting stage, a piece applied on a given item can comprise only a part of the corresponding code and some part of an adjacent code. This is particularly the case with banknotes having a serialized security thread: coded serialization numbers are printed in sequence on a continuous thread, and this thread in cut into pieces of length usually corresponding to a width of a banknote and each piece is applied on (or inserted into) the corresponding banknote, with possible offset problem. Even the lateral positioning of the thread on the banknotes may vary. In some situations, the registration may be difficult due to high speeds of the moving items, absence of sophisticated registration mechanisms, or mechanical impossibility of registration. In any case, linear misregistering makes classical serialization impossible, jeopardizing subsequent identification and/or authentication of the coded items (such misaligned cuts may also occur at the acquisition and reading stage).

An example relates to security threads inserted into the banknotes of many central banks as an authentication feature, as illustrated on FIG. 11. Such threads are made from large polymer or metallic foils and marked with non-varying printing. The foils are cut continuously on big rolls and divided into threads, which are incorporated into the security paper during its fabrication process. Threads are eventually cut only at the end within the banknotes, after printing. No classical serialization is possible due to the absence of linear registration. Therefore, security threads are currently not used in that way.

It is therefore an object of the present invention to provide a method, and a corresponding system, for serialization of items that will allow a linear desynchronization-resilient coding and enable to apply proper serialization in any situations, including those when the codes registration is difficult or impossible.

Thanks to this invention, pharmaceutical blisters mentioned above can now be serialized before being cut and used into medicine pills packaging. Security threads of banknotes can benefit from this invention and can be serialized, as illustrated on FIG. 12. More specifically, a continuous stream of codes printed on security threads can now make two different banknotes never carrying the same inscription and thus, these banknotes can be uniquely authenticated. Moreover, desynchronization-resilience will make them readable under any circumstance. Such an additional security feature can be both human-readable and machine-readable.

SUMMARY OF THE INVENTION

According to one aspect the invention relates to a method for serialization of items, comprising:
  encrypting a unique serial number of each item using encryption key k to obtain a corresponding unique code, and
  marking each item with its corresponding unique code, wherein each unique code has a length L and is included into a string of symbols having a length L' that is marked on the corresponding item, and wherein L' is larger than L.

The symbols of the string of symbols may comprise graphical symbols, selected from human readable characters and machine-readable symbols. These symbols of the string of symbols may be selected from a set of glyphs, preferably from alphabetical, alphanumerical or numerical symbols.

According to a variant of the above method, the unique code is present in the string of symbols at an offset, wherein L' is larger than or equal to (2L−1). In another variant, the unique code is present in the string of symbols at an offset, wherein L' is smaller than (2L−1).

In the above method, the offset of the unique code in the string of symbols is preferably performed by applying different alphabets for different positions of the symbols in the unique code, or by applying a marking between consecutive unique codes, wherein the marking is selected from a spacing, special sign or a box. It is also possible to use no indicator of offsets, i.e. no marking and the same alphabet for all symbols.

The above-mentioned marking of the strings of symbols on the items may comprise direct marking or printing, applying pre-printed labels, or laser engraving. Encrypting a serial number of an item to obtain a unique code may be performed by applying block-encryption or block encryption combined with Format Preserving Encryption (FPE).

Alternatively, encrypting a serial number of an item to obtain a unique code may be performed by self-synchronizing ciphertext feedback based stream encryption wherein symbols of the serial numbers are encrypted one-by-one, in a stream-cipher construction with format preserving encryption (FPE). Ciphertext feedback ("CFB") means that the encryption of one symbol depends on one or several previous encrypted symbols. Moreover, a minimum length L' of the string of symbols marked on an item, may be equal to (L+K), K>0 being a feedback length comprising several characters or at least one symbol in addition to said length L of unique code. In this variant the offset is preferably indicated by using different alphabets for different positions of the symbols in the unique code, or a specific symbol at the beginning of a code.

According to another aspect, the invention relates to a decryption method for recovering a unique code and corresponding serial number from a string of symbols marked on an item according to the method of serialization described above, comprising:
  reading the string of symbols of length L' marked on the item;
  decrypting, based on a decryption key k', blocks of symbols of length L with offsets from 0 to L−1 within the string of symbols of length L' read on the item, with L' larger than L;
  for each serial number candidate n to correspond to a block of length L, calculating a preceding serial number n−1 and a next serial number n+1;
  encrypting with encryption key k the serial numbers n−1 and n+1 respectively, obtaining respectively preceding and next serial number candidates represented as strings of symbols;
  comparing symbol-by-symbol the preceding serial number candidate with the corresponding left part of the string of symbols of length L', and the next serial number candidate with the corresponding right part of the string of symbols of length L',
  wherein
    if all compared symbols match, the correct unique code and the corresponding correct serial number n are recovered from the read string of symbols; and
    if at least one comparison of symbols fails for an offset, no serial number corresponds to said offset.

According to a further aspect, the invention also relates to a system for serialization of items, comprising:
  a memory and a processor, the memory together with the processor are configured to cause the system to encrypt a serial number of each item using an encryption key k stored in the memory to obtain corresponding unique codes, and
  a marking device connected to the processor and adapted to mark the unique codes received from the processor on the items, wherein the system is configured to include each unique code having a length L into a string of symbols having a length L', wherein L' is larger than L, and mark the string of symbols on a corresponding item.

The memory together with the processor may be configured to cause the system to apply block-encryption or self-synchronizing feedback based stream encryption combined with Format Preserving Encryption (FPE).

Alternatively, the memory together with the processor may be configured to cause the system to apply Format Preserving Encryption (FPE), wherein ciphers of the serial numbers are encrypted one-by-one, in a stream-cipher construction.

According to another aspect, the invention further relates to a system for recovering a unique code and corresponding serial number from a string of symbols marked on an item by a system for serialization of items as described above, the system comprising a processing unit equipped with a memory unit, and a reader, wherein the reader is adapted to read a string of symbols marked on an item and store the read string of symbols in the memory unit, and the processing unit is configured to cause the system to perform the operations of:
  decrypting, based on a decryption key k' stored in the memory unit, blocks of symbols of length L with offsets from 0 to L−1 within the string of symbols of length L' stored in the memory unit, with L' larger than L;
  calculating, for each serial number candidate n to correspond to a block of length L, a preceding serial number n−1 and a next serial number n+1;
  encrypting with encryption key k the serial numbers n−1 and n+1 respectively, and obtaining respectively preceding and next serial number candidates;
  comparing symbol-by-symbol the preceding serial number candidate with the corresponding left part of the string of symbols of length L', and the next serial number candidate with the corresponding right part of the string of symbols of length L',
  wherein
    if all compared symbols match, the system is adapted to deliver a signal indicating that the correct unique code and the corresponding correct serial number n are recovered from the read string of symbols; and
    if at least one comparison of symbols fails for an offset, no serial number corresponds to said offset.

The present invention will be described more fully hereinafter with reference to the accompanying drawings in which like numerals represent like elements throughout the different figures, and in which prominent aspects and features of the invention are illustrated.

BRIEF DESCRIPTION OF THE DRAWINGS

FIG. 10 shows an example of a proprietary barcode/symbology, made of mini 1D/2D patterns printed linearly, each pattern representing a symbol of the alphabet.

DETAILED DESCRIPTION

Figure 1:
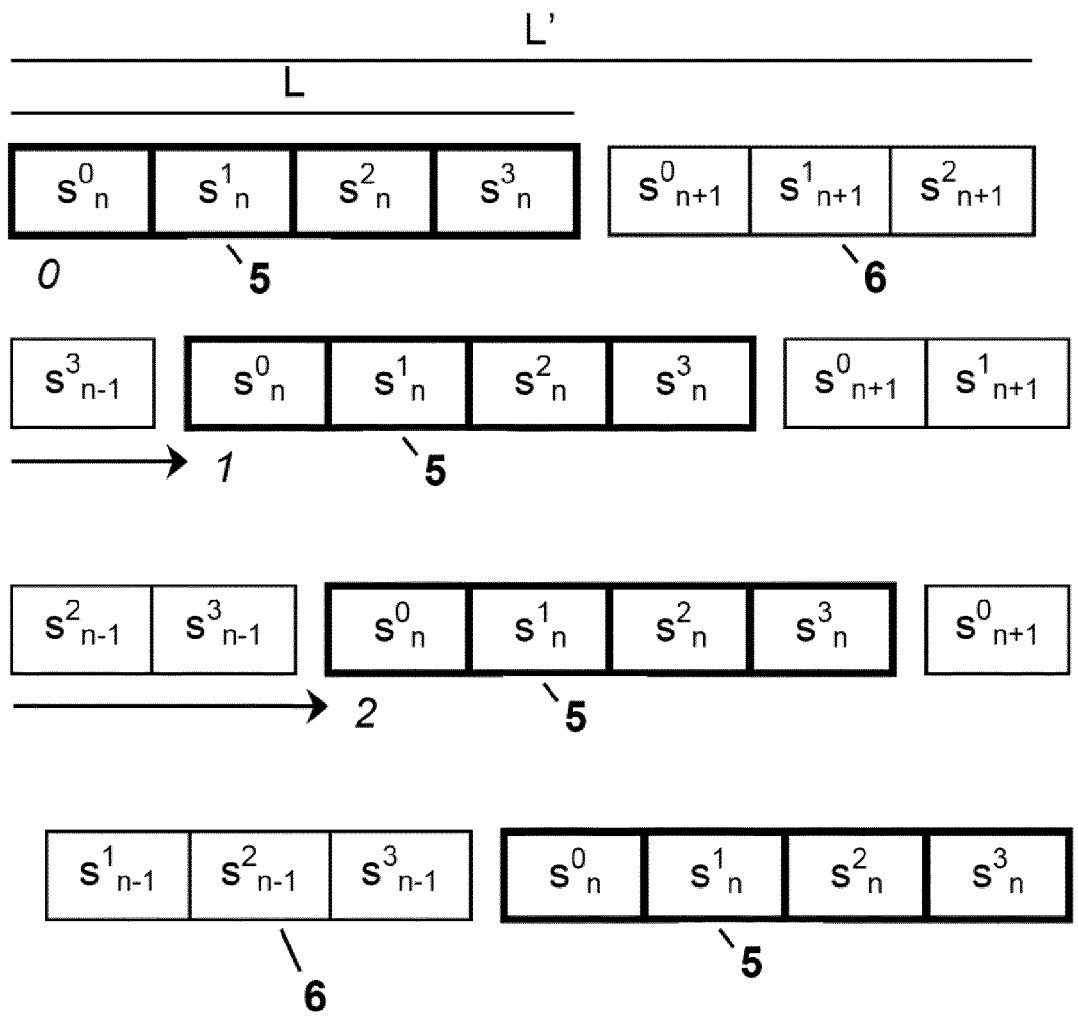
FIG. 1 illustrates an example with seven printed characters (the symbols of a concatenation string of length L'=7) for 4-characters length codes (the symbols of codes of length L=4).

A serial number is a unique number associated with a single item. A serial number corresponds to an ordinal belonging to a collection of serial numbers, logically ordered in a known sequence such as 0, 1, 2, 3, 4, . . . , n−1, n, n+1, . . . , M−1; this collection contains M different serial numbers in total, with M being larger than or equal to the total number of items that have to be marked (e.g. the total number of items of a production batch). Therefore, each item is uniquely associated with a serial number, such as the serial number n is associated to the n-th item, the n+1 to the (n+1)-th item, and so on. Serials number can be represented in any base such as decimal or binary: the minimum bit-length $L_{bin}$ required to encode these M different serial numbers is $L_{bin}$=ceil($\log_2$(M)), or the minimum decimal digit-length $L_{dec}$ is $L_{dec}$=ceil($\log_{10}$(M)) (with $\log_2$(.) and $\log_{10}$ (.) being the logarithms in base 2 and base 10 respectively, and ceil(.) being the smallest greater than or equal to −integer value).

These serial numbers are then scrambled (e.g. encrypted) to conceal their actual order, to prevent a potential counterfeiter to easily guess the succession of serial numbers from a few known serial numbers. For this purpose, the serial numbers are encrypted with an encryption algorithm using an encryption key k, that should be kept secret, resulting scrambled serial numbers, which will be converted/formatted into encoded numbers, or codes, to be marked on the items. Since encryption is one-to-one reversible, there is a bijective relation between seral numbers and scrambled serial numbers (i.e. the codes): the latter are also unique, and each original serial number can be recovered by decrypting the scrambled serial number with a decryption key k' corresponding to key k used for encryption. The ordering of scrambled serial numbers is not predictable for a counterfeiter without knowing the decryption key k'. Scrambled formatted serial numbers can be represented in another base than non-scrambled formatted serial numbers, although usually the same base is used for both.

An alternative to encryption would be to simply generate a sequence of true random codes and store them in a database, associated with their sequential indexes 0, 1, . . . , n, n+1, . . . . However, this does not guarantee their uniqueness over a very long sequence of codes. Moreover, checking for each new code that is not already in the database would be computationally unpractical.

In contrast, the first advantage of encryption of serial numbers is that it is a very easy and commonly used method to generate codes in a shuffled order, as a result of the bijective nature of encryption. These codes can also be stored into a database (with their associated serial numbers as indexes) as if they were truly random, but without the need for uniqueness check.

A second advantage of encrypting serial numbers is that it allows us to avoid the use of a database of codes: finding the serial number from a code just requires a key.

In general encryption for serialization uses symmetric encryption, i.e. k=k' that should be kept secret. It is denoted by box E on FIG. 3, with reciprocal, decryption, denoted by $E^{-1}$. A generalization to asymmetric cipher is theoretically possible (with different k and k', k kept private), but at the price of significantly longer scrambled serial numbers to ensure sufficient cryptographic security: e.g. for RSA, a minimum of 2048 bits is recommended, or 256 or 384 for Elliptic Curve Cryptography, etc. Requiring such long serial numbers (and scrambled serial numbers) is usually a problem to serialize items with serial numbers, where the shortest possible length L' of marked strings is required.

By contrast, symmetric encryption offers the possibility to reduce the bit-length of serial number to the shortest value ensuring a total number of serial numbers M that is sufficient. Usually symmetric block-encryption is used such as AES, Twofish, IDEA, DES, Triple-DES, etc., for encrypting serial numbers one-by-one. However, they use fixed block lengths: 64 bits, 128 bits, etc., therefore a step must be applied to ensure a block-size better adjusted to the M needed serial numbers (generally shorter than 64 bits). This can be done by applying well-known and validated composition methods on top of these schemes, such as Feistel construction. It is also possible to derive ad-hoc block-length keyed ciphers from un-keyed secure hashing algorithms (like the SHA-2 family, Whirlpool, etc.) with Luby-Rackoff constructions.

In case of symmetric encryption, another generalization consists in using non-block encryption such as Stream Encryption or Stream Cipher: bits or groups of bits of the input data are sequentially and continuously encrypted by combining these groups of bits with a pseudo-random sequence of groups of bits, this pseudo-random sequence being cryptographically generated depending on the key k (usually bits are XOR-ed with the original data bits). However, re-synchronization mechanisms should be used to ensure the decoding stage. Stream encryption is not relevant nor recommended for the first serialization method via symmetric block-encryption (i.e. "Method 1"). By contrast, a second serialization method (i.e. "Method 2") takes fully advantage of stream encryption with ciphertext feedback and is described in a later paragraph.

Before marking items, scrambled serial numbers must be formatted into strings of L symbols (i.e. strings of length L or L-length code), resulting into codes, which consequently are also scrambled (as their ordering within the sequence of codes is not predictable). Formatting is represented as operation "A" in the FIG. 3, and its reciprocal, i.e. un-formatting as operation "$A^{-1}$". Each symbol is taken from a finite set of N possible symbols, set called an alphabet of cardinality N. Such formatting is generally a base conversion with the base equal to the alphabet cardinality N, optionally with splitting of the code into small groups of symbols to make this conversion more efficient. In general symbols at different positions from the beginning of the L-length code can be encoded by different symbols, from one alphabet or from different alphabets depending on this position in the code, and possibly with different cardinalities. However usually the same alphabet and same cardinality are used for all L symbols. A L-length code uniquely represents a serial number, but usually in another base than base 2 (binary), and generally in a format more suitable for item marking and human reading.

Consequently, the length L of a code should be large enough to allow the totality of items to be marked: L=ceil ($\log_N(M)$), where N is the alphabet cardinality (we consider the same alphabet for all symbols, for simplicity), $\log_N(.)$ the logarithm in base N, ceil(.) the smallest greater than or equal to −integer value, and M the total number of different serial numbers, codes, or items to mark.

It is usual practice in the field of serialization to choose M many times larger than the total number of expected items to make codes less prone to be guessed by an attacker. This reduces the probability that a random (guessed) code corresponds by chance to an existing serial number/existing item.

Finally, to mark a physical item, each symbol of a code should be given a graphical representation. They can be (and not restricted to) any human readable character, graphical symbol, ideogram, glyph, drawing, etc., or even a machine-readable symbol like 1D or 2D barcodes, in monochrome or in color. Alternatively, it may be imperceptible to the human eye (e.g. printed with IR or UV ink), and exclusively detectable by machines and algorithms. We call such a representation of a code ready to be marked a markable code.

It has been described above how serial numbers can be scrambled (i.e. encrypted) before being formatting into L-length codes, but this is not mandatory: it is also possible to format serial numbers before their scrambling. In this case we obtain formatted serial numbers (but not yet scrambled, and so they are not "codes") consisting of L-length symbols from the alphabet(s) introduced above. Their generation order is still predictable, and one then needs to scramble them. In order to preserve the formatting in encryption, a Format Preserving Encryption (FPE) should then be used, i.e. a cipher that takes a string of symbols of length L as input, and results into an encrypted L-length string of symbols generally taken from the same alphabet(s) with the same cardinality(ies). In the state-of-the-art FPE is used for example: to encrypt credit card numbers; to encrypt texts such as words in one language are encrypted into other words of the same language; etc. Several algorithms exist, but an FPE can also be constructed from block ciphers (like AES, DES, introduced above) for example using Feistel constructions. Such a cipher works at the symbol level rather than at the bit level. At the end one finally obtains the codes, that must be converted into L-length strings of glyphs resulting into markable codes. All previous considerations made with symmetric block-encryption are the same, serial numbers being encrypted one-by-one into markable codes.

Such serialization is easily read and decoded when codes are synchronized with items: just read and decrypt codes one-by-one. However, this approach doesn't work anymore when desynchronization occurs: no trigger, no visible mark, spacing, etc. allows to find the beginning and the end of each code. Worst, one part of the previous code may be concatenated with one part of the following code on one marked item.

Therefore, additional techniques are used to recover from such codes, jointly with marking more code symbols/glyphs per item, i.e. L', than the actual code length L, to help this re-synchronization. For this purpose, the L-length markable codes are generated successively, a code corresponding to a serial number n (and corresponding item), the next code to the next serial number (let's denote it n+1), the next-next one to the n+2 serial number, and so on. All the markable codes form a long (continuous) string made of successive L-length strings of symbols concatenated together, in the described order. Generally, to mark a code on an item, this long string is cropped at (more or less) uncontrolled position/length, resulting into a short "concatenation string", i.e. a string of symbols comprising symbols of only a part (of length shorter than L) of a code of length L. This short concatenation string is the string of symbols that is effectively marked on the item. Therefore, short concatenation strings are un-synchronized, i.e. one doesn't know which symbol(s)/glyph(s) is the first of a marked code within such short concatenation strings. We are in the case where no other synchronization technique can be used, e.g. there is no visible mark nor trigger signals to help re-synchronization when reading codes. According to the invention, in order to avoid such possible un-synchronization effect (or desynchronization effect), the length L' of a concatenation string should be strictly larger than L (L'>L), consequently this concatenation string now contains at least two parts of two consecutive codes.

For generality, this also includes cases where such desynchronization occurs at the reading stage rather than at the marking stage, e.g. when a long contiguous marked stream of symbols is present with no visible synchronization mark.

The above mentioned Method 1 according to the invention is a method to recover the proper code and the corresponding serial number from one marked item, as produced by the code generation and marking process described above. We thus have a concatenation string of length L', with L'>L (L being the length of a code) and unknown synchronization within items. One can distinguish the two cases: the case with L'≥(2L−1), and the case with L'<(2L−1)

1) Case L'≥(2L−1):

This case is depicted on FIG. 1 with a code of length L=4 and a marked string of symbols (i.e. concatenation string) of length L'=7, thus here L'=(2L−1). One does not know the synchronization, i.e. what is the position of the first symbol of the L-length code within the L'-length concatenation string. Let's call this position the offset position, or simply the offset, of the L-length code from the beginning of the L'-length concatenation code. But one knows that a complete L-length code (see block (5) on FIG. 1), with four symbols $S^0_n$, $S^1_n$, $S^2_n$, $S^3_n$, is always present at least once within the L'-length concatenation string i.e. concatenated blocks (5)+(6), surrounded left and/or right by incomplete parts of a code, i.e. part (6) (corresponding three symbols $S^0_{n+1}$, $S^1_{n+1}$, $S^2_{n+1}$ of a next item n+1). L different offset positions should be tried; this is enough since the possible number of desynchronizations obviously equals the length of a complete code, any additional offset repeating a previously tested offset.

Figure 3:
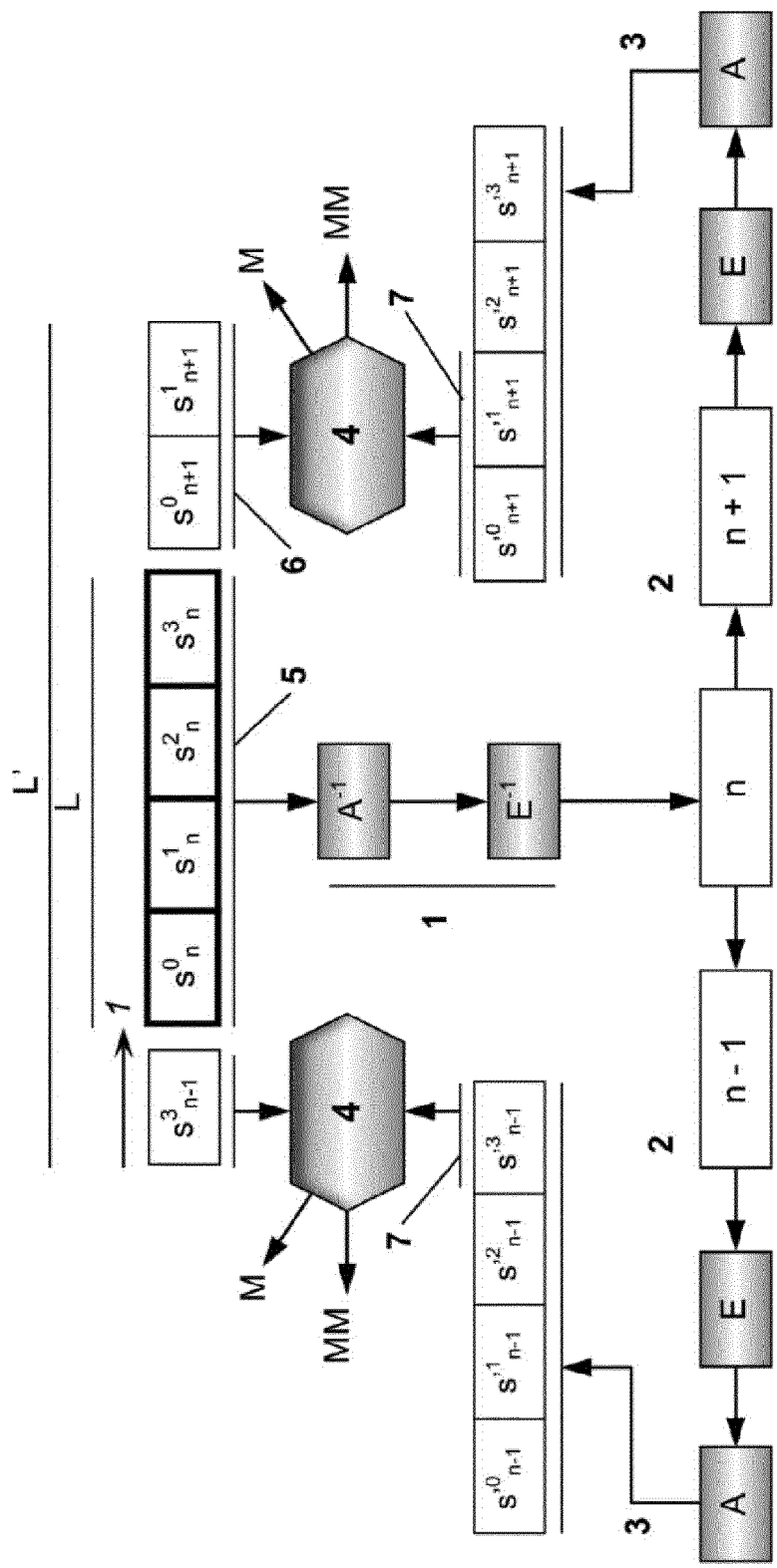
FIG. 3 is a schematic illustration of a method to decrypt serial numbers with longer printed codes than the actual serial length.

The method, illustrated on FIG. 3, comprises the following steps:

For each offset position, currently position 1 indicated by an arrow on FIG. 3, from 0 to L−1 from the beginning of the L'-length concatenation string, crop a L-length candidate code $S_n$ (5) consisting of symbols $S^1_n$, i=0, 1, 2, 3.

Figure 5:
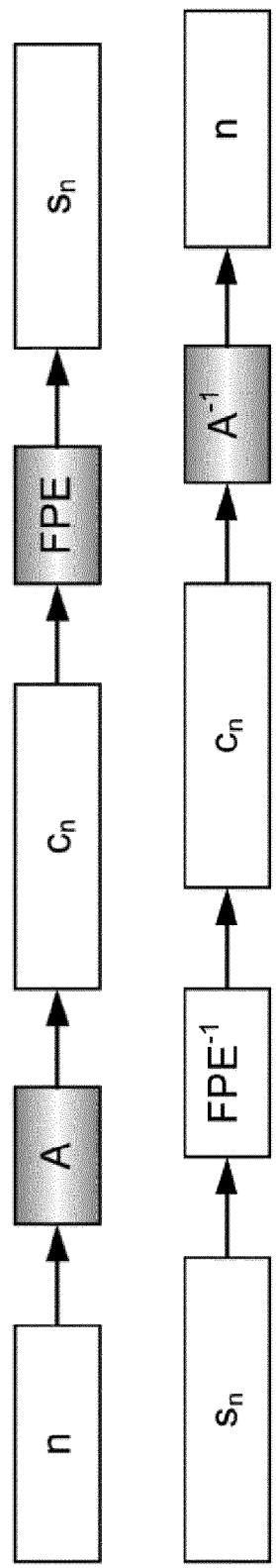
FIG. 5 illustrates using format preserving encryption for serialization.

Decrypt this candidate code with the decryption key k' resulting into a serial number candidate n. Decryption is applied in the inverse way encryption was applied, and depending of this do:

Either: (1) Invert formatting (i.e. apply $A^{-1}$) i.e. unformat this L-length symbol code candidate to get the corresponding scrambled serial number, then decrypt the result to get the corresponding serial number candidate n (i.e. apply $E^{-1}$) using the decryption key k';

Or: Decrypt the L-length symbols code with Format Preserving Encryption (apply an $FPE^{-1}$, no represented here) to obtain a formatted serial number candidate using decryption key k', then invert formatting (i.e. apply $A^{-1}$) of the latter to find the corresponding serial number candidate n;

For this serial number candidate n, calculate its preceding candidate n−1, and its next candidate n+1 (2);

From this preceding candidate n−1 and this next candidate n+1 obtain the corresponding encrypted and formatted preceding and next candidates, respectively (3) by:

Either: Encrypt the preceding n−1 and the next n+1 serial number candidates using the encryption key k, and format (via operation A) the obtained preceding and next scrambled serial number candidates to form the preceding and next code candidates $S'_{n-1}$, $S'_{n+1}$ respectively;

Or: Format (A) the preceding and next serial number candidates n−1 and n+1 respectively to get the formatted seral number candidates, encrypt them with FPE using encryption key k to obtain the preceding and next code candidates $S'_{n-1}$, $S'_{n+1}$ respectively. Encoding using FPE is depicted on FIG. 5: encryption is applied after formatting, rather than before.

Compare (4) (see on FIG. 3) the symbols of preceding candidate $S'_{n-1}$ (7) with the corresponding symbols of read concatenation string (6) left before currently tried offset position (if any); compare (4) the symbols of next candidate $S'_{n+1}$ (7) with the corresponding symbols of read concatenation string (6) right starting from currently tried offset+L (if any):

If all symbols match (result M from 4, left and right), then the correct offset, the correct code and the correct serial number n have been found: one can retain this serial number n as a correctly decoded candidate;

If at least one symbol comparison fails (i.e. mismatches, result MM left or right), no serial number corresponds to this offset;

If all offsets from 0 to L−1 have been tried, and for all cases at least one of compared symbol pair mismatches (MM), then the code cannot be decoded: the read code has probably errors.

Normally, one expects that only one tried offset in the concatenation string result into a valid decoded serial number n. It is possible however that sometimes, more than one serial numbers n' and n" are successfully decoded from the same L'-length concatenation string: this is an ambiguity that probably cannot be avoided: for any valid code, it may exist another code in the complete sequence of M codes that matches when desynchronized. In such case however only one of n', n" is the correct one, i.e. has been used for encoding. To reduce such ambiguities, one can apply the following techniques:

Ensure that L is large enough so that the used alphabet(s) is (are) of sufficient cardinality(ies) N; In practice, testing showed that for L=6 length codes, using base 32 Crockford encoding (i.e. alphabet cardinality N=32), ambiguities occurred with a probability of $1.7 \times 10^{-7}$ for L'=2L−1=11, and $6.2 \times 10^{-9}$ for L'=2L=12;

Make use of a priori known information, not encoded in the code itself but usually related to the corresponding batch of items, from which the expected properties of the sequence of serial numbers can be known. An example can be the expected batch number, i.e. the start n1 and end n2 serial numbers, therefore any decoded n which does not respect the condition n1≤n≤n2 can be rejected.

In principle, L' has no upper limit, and increasing L' reduces the occurrence of ambiguities above. But of course L' is chosen as small as practically acceptable in the targeted context.

Figure 2:
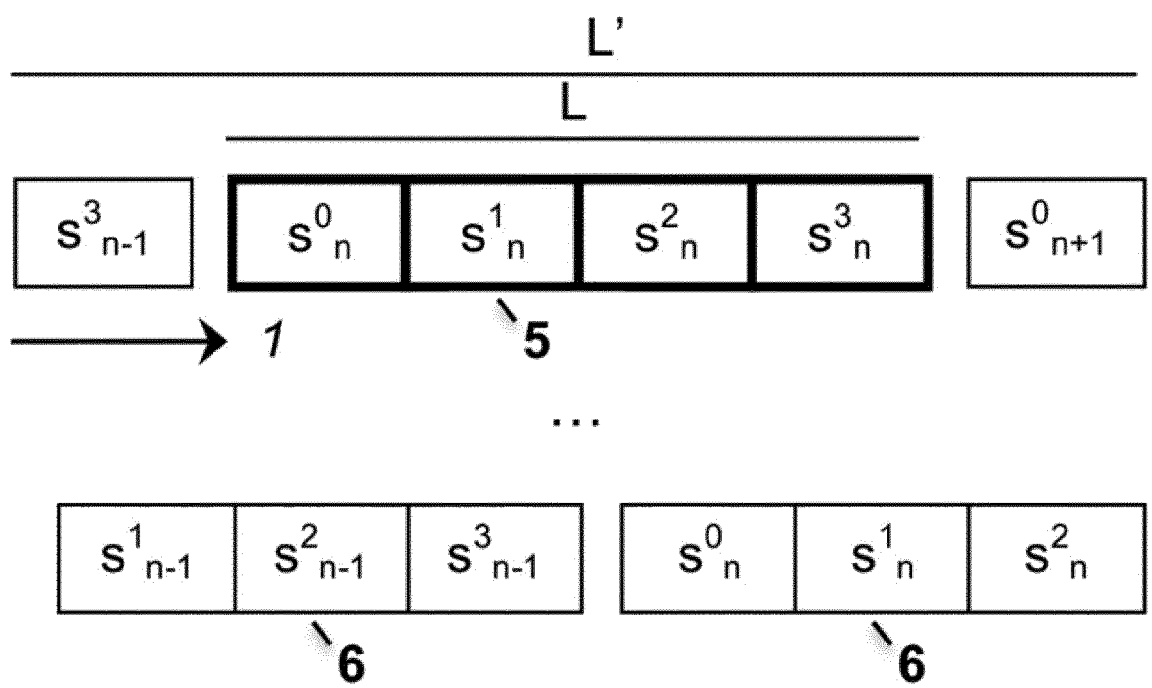
FIG. 2 illustrates an example with six printed characters (L'=6) for 4-characters length codes (L=4).

2) Case L'<2L−1:

This case is depicted on FIG. 2 with L=4 and L'=6, thus L'<2L−1. In that case, for some offset positions a complete L-length code is present (5), but for some other offset(s) no complete code is present within the L'-length concatenation string: for these latter the concatenation string consists of the concatenation of parts (6) from two consecutive codes but none of them being complete. However, a complete code candidate can still be cropped for some offsets because L'>L.

Figure 4:
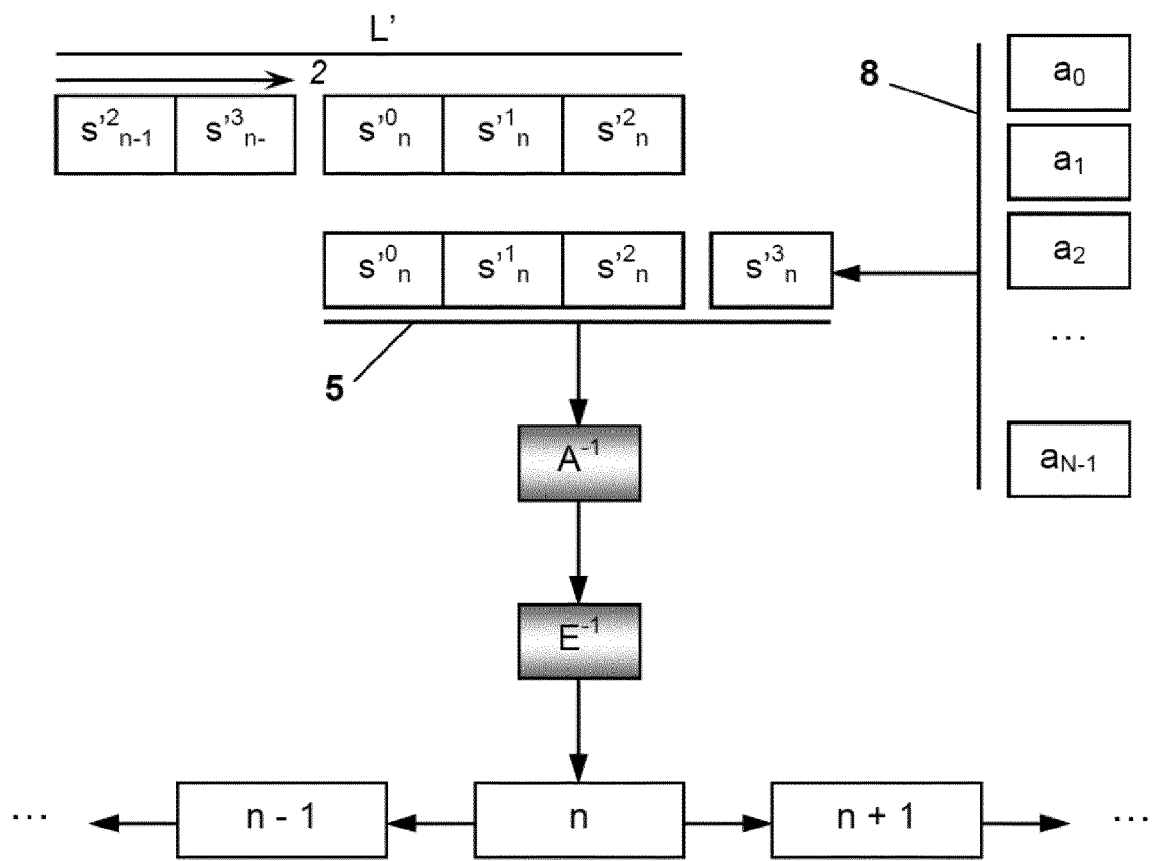
FIG. 4 is a schematic illustration of a method to decrypt serial numbers when the L-length code is not present within the L' characters, may happen when L' is less than 2L−1.

The decoding process works, the same as for the Case L'≥2L−1 above, with no modification required, when a complete L-length code candidate is cropped from the concatenation string. But a specific method is needed in the case of a code candidate of length<L, as shown on FIG. 4. In this situation, a starting offset position P is defined, being negative when L'<(2L−2) as explained below. Additional techniques are used for offsets in which only two incomplete candidate codes parts are present. This is the case when P is negative (P<0: symbol(s) are missing left), or when the position of candidate code's last symbol exceeds the concatenation string length (i.e. P+L>L': symbol(s) are missing on right).

Incomplete code candidate cases are solved by an exhaustive search on this (these) missing symbol(s). Solving the incomplete code candidate case works as follows:

The first (left-most) offset position to try can be given by: P=floor((L'−(2L−1))/2), with respect to the beginning of the L'-length concatenation string, with floor(.) the greatest smaller than or equal to −integer value, and "/" the division; |P| is actually half of the potentially maximum missing symbols with respect to the length (2L−1). The goal being to minimize left or right missing symbols of the candidate code, this is why P can be negative;

The last offset position is P'=P+L−1; let's define also the position of the last symbol for this last offset as Q=P'+L−1=(P+L−1)+L−1=P+2(L−1), Q being the right-most position of the last symbol of the candidate code within the concatenation string of length L';

For each offset position p from P to P' (P' included), crop a L-length code candidate. We have the sub-cases below:

if p≥0 and p+L−1<L', no symbol is missing to the left or to the right of the L-length candidate code: it is complete and there is nothing more to do;

if p<0 (possible if P<0), one has |p| missing symbols to the left; hence, R=|P| is the maximum missing symbols to the left of the L-length candidate code. On the other hand, if p+L>L', then one has missing symbols to the right; hence at most R=Q−(L'−1)=P+2(L−1)−(L'−1)=P+2L−L'−1 maximum missing symbols to the right of the L-length candidate. In both situations, missing symbols, to the left or the right, are filled with all combinations (8) (see FIG. 4) of missing symbols from their alphabet(s) ($a_i$, i=0, . . .

, N−1), resulting into as many L-length code candidates (5). Note that symbols can be missing at left side or at right side, but never at both sides, as a result from the condition L'>L.

For each such candidate L-length code, subsequent steps are exactly the same as those for the case L'≥2L−1 above. The only difference is that for each missing-symbol(s) case, one candidate becomes here many candidates according to the missing symbol(s) exhaustive search.

To reduce ambiguities one can use batch-related a priori known information as for case L'>=2L−1: e.g. the expected batch range, i.e. a start n1 and an end n2 serial numbers, etc.

In the above Method 1:

The missing symbol(s) exhaustive search can be computationally heavy, limiting in practice the maximum number of missing symbol that the method can achieve in real scenarios. Consequently L' should remain reasonably close to 2L−1: the maximum number of exhaustive searches required for a given offset position is $N^R$ with R the maximum number of missing symbols from an alphabet of cardinality N, and this number increases rapidly. For example, one can consider a maximum of R=2 or 3 missing symbols as an acceptable maximum for a 32-cardinality alphabet (i.e. for N=32, R=2 leads to 1024 iterations, and R=3 leads to 32'768 iterations!).

As already mentioned, the starting offset position P is negative in order to limit the maximum number of missing symbols R, otherwise this number would be twice more if offsets positions simply started from 0.

Finally, guessing missing symbols increases the occurrences of ambiguities that can occur at the decoding stage, since less information is available in the L'-length concatenation string when L' decreases. In the extreme case L'=L, all tried offsets position would be ambiguous, this is why the constrain L'>L has been fixed. Again, L' should remain reasonably close to 2L−1 to achieve a low probability of ambiguities.

The above-mentioned Method 1 according to the invention relies on block-encryption approach, by contrast with Method 2 wherein the serial numbers are encrypted and decrypted one-by-one. However, ciphers exist with self-resynchronizing capabilities that can be used to solve desynchronization issues. These are called self-synchronizing stream ciphers, and such property makes them naturally suitable for desynchronized serialization.

A stream cipher is an encryption scheme where plaintext digits (or characters, symbols, etc.) are combined with a key-dependent pseudo-random stream. Each plaintext digit is encrypted one-by-one with the corresponding digit of the pseudo-random stream, resulting into an encrypted digit. Since encryption of each digit is dependent on the current state of the cipher, it is also known as state cipher. Usually, a digit is a bit and the combining operation an exclusive-OR (XOR). In order to achieve symbol-by-symbol (not bit) encryption, a Format Preserving Encryption (FPE) is used, preserving the alphabet of each symbol. Since it is also a stream encryption, let's name it a stream FPE, or sFPE.

Self-synchronizing stream cipher is a stream-cipher where the current state depends on the K previous digits, characters etc., of the cipher text. Such schemes are also known as asynchronous Stream Ciphers. The idea of self synchronization has the advantage that the receiver automatically synchronizes with the key-stream generator after receiving K ciphertext digits: in case of error(s), the scheme automatically resynchronizes after decrypting K digits. An example of a self-synchronizing stream cipher is a block cipher used in cipher feedback (CFB) mode.

Stream ciphers are often used for their speed and simplicity and especially in applications where plaintext comes in quantities of unknowable length. This avoids also the issue of need for padding for block cipher (and resulting loss of performance or space), when the data should be transmitted continuously digit by digit (often: characters, bytes)

Examples of common stream ciphers are: ChaCha, RC4, A5/1, A5/2, Chameleon, FISH, Helix, ISAAC, MUGI, Panama, Phelix, Pike, SEAL, SOBER, SOBER-128 and WAKE. Secure stream ciphers can also be constructed from block cipher or cryptographically secure hash codes with specific constructions.

The same considerations stand for encryption key k and decryption key k' as for Method 1: in theory, stream encryption can be either symmetric encryption or asymmetric encryption.

However existing stream and FPE are actually symmetric ciphers. This is due to their symbol-by-symbol nature, a symbol being a short bit-length element, while asymmetric encryption like RSA would require large (or very large) words, what in not practical. The most important being that the pseudo-random sequence used for encryption requires the same seed to be re-generated identically, implying a symmetric key with k'=k.

Although stream encryption/decryption resynchronizes automatically, it gives no information on the actual beginning of a L-length code. Consequently, additional techniques are required to identify code synchronization within the concatenation strings, which are described below.

Figure 6:
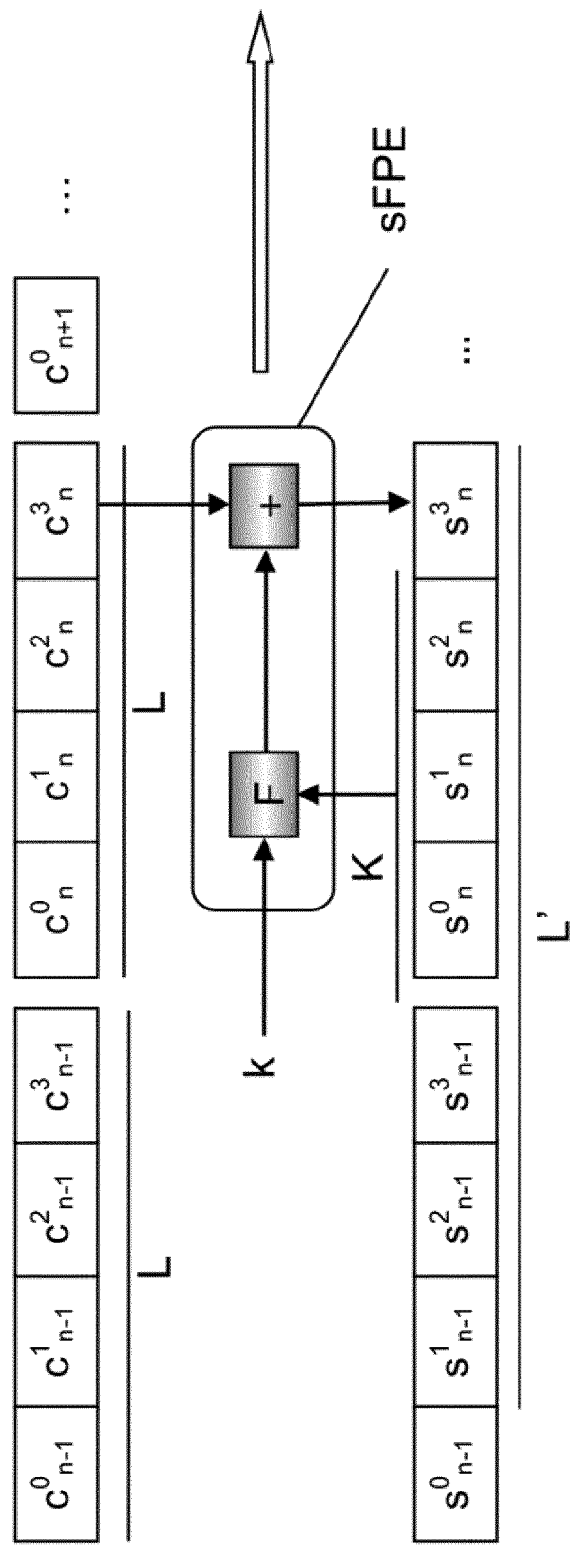
FIG. 6 illustrates using stream cipher format preserving encryption for serialization, for 4 characters length (L=4) codes and 3 characters length (K=3) ciphertext feedback.

For generation of serial numbers and marking, the invention uses self-synchronizing stream cipher applied on formatted serial numbers, illustrated on FIG. 6. As in the case of Method 1, serial numbers are uniquely associated with items, denoted 0, 1, 2, 3, 4, ..., n−1, n, n+1, ..., M−1, in a consecutive manner. Unlike Method 1 however, they are preferably formatted first, concatenated as a continuous stream, and then encrypted. Consequently, a sFPE ("stream FPE") is required.

Figure 7:
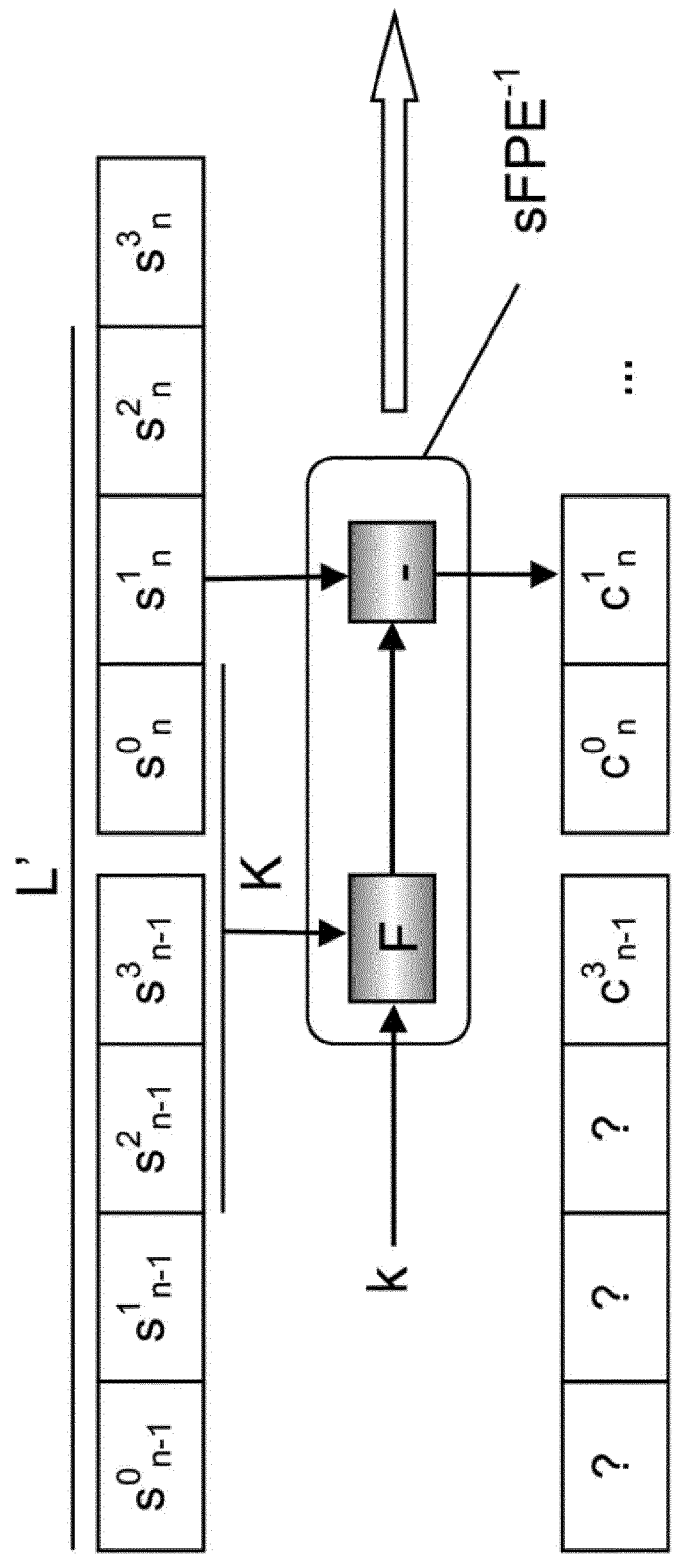
FIG. 7 illustrates a serialization decrypting scheme, which requires at least L'=L+K printed characters to properly decrypt L characters.

The method is illustrated by FIG. 6 for encryption and FIG. 7 for decryption, applied to serialization with code length L=4, number of received encrypted symbols L'=7, and thus K=L'−L=3. A one-way cryptographic function F continuously generates pseudo-random values from the K previously encrypted symbols $S^i_n$ (i=0, 1, 2 ... ) and the key k, progressing in the direction of the arrow. For generality, the combination of pseudo-random stream value with the cleartext data symbols $C^i_n$ is represented as an addition "+" for encryption (e.g. on FIG. 6, added to $C^3_n$), and as a subtraction "−" for decryption (e.g. on FIG. 7, subtracted from $S^1_n$). In decryption, the K first symbols cannot be decrypted since these ones lack the K previous symbols in the L'-length concatenation string, and are noted as "?" on FIG. 7.

Defining L'=L+K (with K>0) as the minimum length (of a string of symbols) to be able to decrypt at least L symbols. But in general L'≥L+K, or L'=L+T+K with T≥0. The overall method is depicted on FIG. 8 for encryption, and FIG. 9 for decryption, with L=4, T=1, K=3 and thus L'=8.

Figure 8:
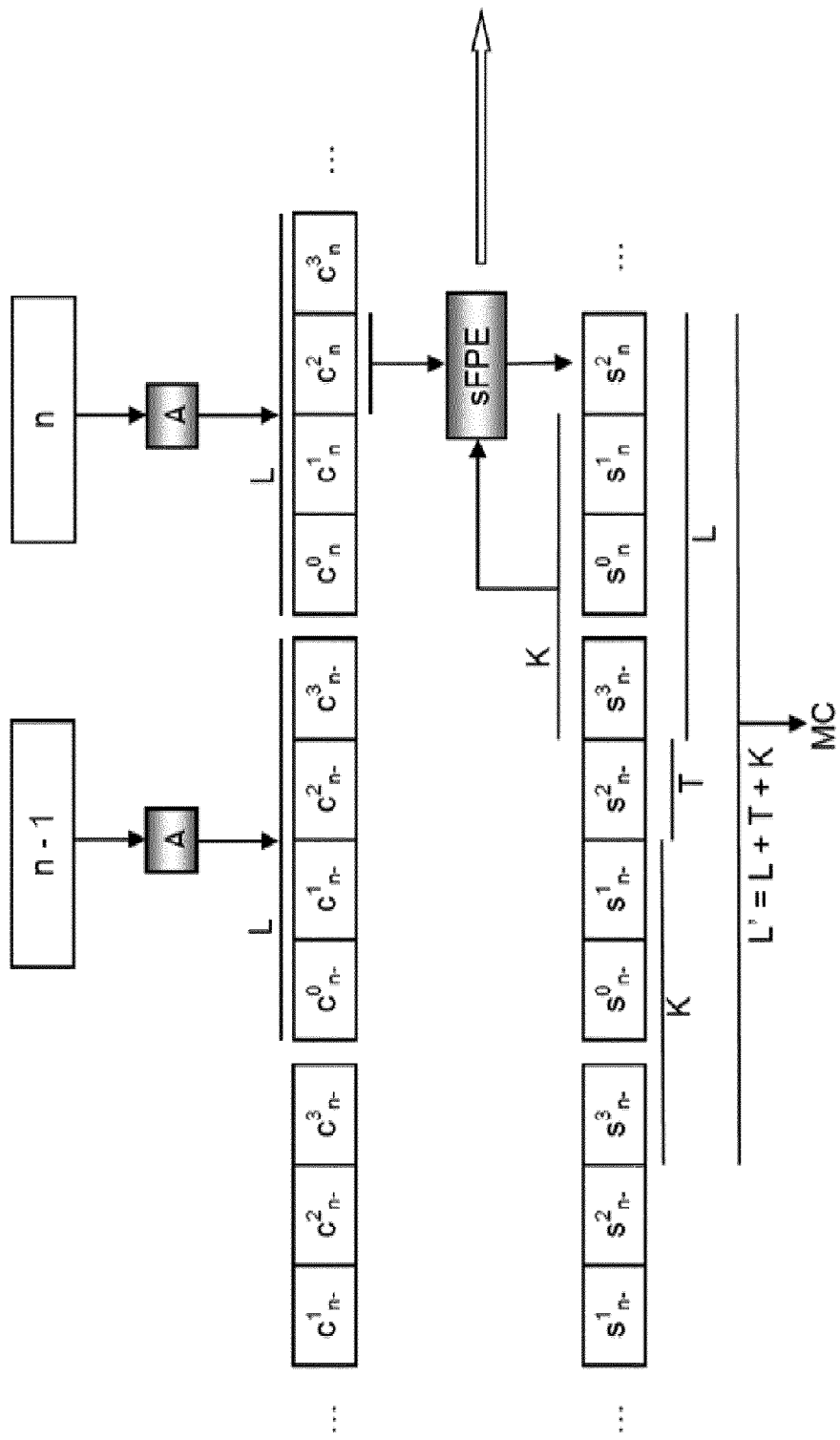
FIG. 8 is a schematic illustration of a stream cipher serialization encryption, with L'=L+K+T, T being an optional extra length, i.e. T≥0 (here: T=1 and L'=8).

The generation of codes corresponding to Method 2 works as follows:

Serial numbers are formatted using the code symbols from alphabet(s) as defined in Method 1, resulting into formatted serial numbers $C^i_n$ of FIG. 8. They are not scrambled yet.

The sequence of formatted serial numbers can be considered as being concatenated, arranged in the same order as the input serial numbers to form a longer and not yet encrypted continuous string. The length of a concatenation string is L'=L+T+K, with K>0 the feedback length and T≥0 a number of extra symbols useful for resynchronization when serial numbers have to be decoded.

Then a self-synchronizing stream cipher is applied onto this non-encrypted string, using an encryption key k, taking as input the string symbols $C^i_n$ on consecutively and a sequence formed by the K (with K>0) previous encrypted symbols as a feedback to achieve self-synchronization when decrypting. Feedback is propagated across successive codes, meaning that one or more of the first symbols of each code depend on feedback from encrypted symbols of the previous one.

In order to work within symbols, this cipher is a stream Format Preserving Encryption (sFPE), therefore it encrypts formatted serial numbers symbol-by-symbol from one alphabet(s) to one alphabet(s)—usually the same alphabet, resulting into encrypted symbols $S^i_n$. This results into an "endless" string of L-length codes, encrypted and concatenated in consecutive order. Encrypting one symbol can work for example by arithmetically adding the output of the encrypting function with the input symbol, modulo N the cardinality of the corresponding alphabet.

As for Method 1, this string is cut into L'-length substrings with L'>L, in an (more or less) uncontrolled manner, forming the concatenation strings. It should be ensured that L'=L+T+K with K>0 and T≥0 to enforce future decodability, resulting from the ciphertext feedback mechanism.

Symbols of these L'-length concatenation strings, converted into glyphs or graphical elements as in Method 1 to form markable codes MC, are then applied onto the consecutive items.

Concatenation strings should be at least of length L'=L+K (with T=0), to ensure that at minimum L symbols are properly decoded. These symbols may be non-consecutive with one part of previous code concatenated with the current code, after decryption. Then re-synchronization techniques, described next, will be used knowing that previous code is n−1 with respect to the current one n, as in Method 1. Additionally, using extra symbols (with T>0) provides additional information to help re-synchronization, knowing that stream-cipher guarantees that (L+T) symbols are properly decrypted (but without indication of the actual code offset), as described hereunder.

In the supposition of a continuous uninterrupted and unique sequence of codes corresponding to serial numbers from 0 to M−1, each code depends on its previous code. In the case of codes generated from different batches of items: the first L'-length concatenation string of each batch would have to include the K-length end part of the last code of previous batch; all batches would have to be generated consecutively, to know each batch last code; and the very first concatenation string (corresponding to serial number 0) would require an initial K-length feedback string, defined either as random, or set to a fix constant, for example as "all-zeros" for simplicity.

The whole sequence of codes corresponding to serial numbers from 0 to M−1 then would completely depend from this initial feedback string in addition to the encryption key k. This value is required for future decryption, but it is by definition included into the concatenation strings. Such an initialization value impacting subsequent encryption flow is often referred as a nonce or an Initialization Vector in the cryptography community.

However, forcing the complete sequence of codes to be unique as just explained is not required for serialization. In practice, codes can be generated by different batches that do not have to be consecutive, nor consistent within each other from the encryption feedback point of view. The only required constraint for different batches is to correspond to non-overlapping ranges of serial numbers with respect to each other. An IV arbitrary value (or fixed constant or "all-zeros" value) can be defined at the beginning of each batch. In the extreme case, although not practical, a random IV could be generated for each new code. The very first code (or a few first codes) can be just skipped to generate the first concatenation string of a batch. This is possible because IV/feedback symbols are included within the concatenation string and thus do not need to be stored for decryption: this decryption from concatenation strings always results into the correct serial number n.

But IVs used for batches must be stored (with batches having a beginning and an end) only in case the same batches would have to be re-generated several times, identically, unless constant (e.g. "all-zeros") IV are used. Moreover, such batch-attached IVs can be used as additional information (or "side information") to check that a decoded concatenation string was actually correctly decrypted.

At the decoding stage, self-synchronizing stream cipher ensures always correctly decrypted symbols from any input after the K first symbols, but does not give synchronization information by itself: the beginning (and end) of at least one code has still to be found. Thus, additional methods are needed to find the offset position of a code within the concatenation string.

A first approach is to provide additional symbols (with T>0) to allow the verification of tried offset positions by symbol-by-symbol comparisons. This corresponds to the decoding stage Case 1 of "Serial number decoding" description hereunder, for which no synchronization information is included into the L-length encrypted coded. Then T>0 simply adds more correctly decoded symbols helping to reduce decoding ambiguities.

A second approach is to include additional synchronization information (added before encryption), named synchronization tagging, as part of the L-length code (the added information being now encrypted), when formatting serial numbers. This is the Case 2 of "Seral number decoding" description hereunder. This can be done, but is not restricted to, by:

Type-1 tagging: Add a synchronization symbol for example at the beginning of each formatted serial number, in addition to the (L−1) remaining symbols of a formatted serial number.

Type-2 tagging: Use symbols from one subset of the alphabet for the first symbol of each formatted serial number (typically half of the alphabet), and the symbols from another alphabet subset for the (L−1) remaining symbols (typically the complementary half subset).

It is important that such synchronization tagging is done in the non-encrypted domain, making it hidden in the resulting encrypted codes and concatenation strings: no information about synchronization is given to an attacker knowing that he has access only to scrambled codes. To achieve this, symbols are encrypted over the complete cardinality(ies) N of alphabet(s), regardless the different alphabet subsets used for input symbols, or if a delimiter symbol is used. Consequently, such tagging is not equivalent to introducing visible marks separating codes.

This tagging should be reversible at the decoding stage to allow the recovery of the original serial numbers n from the decrypted formatted serial numbers. Tagging can be seen as just an additional step in formatting serial numbers, in addition to base conversion.

Tagging can increase the required code length L to cover all the M items with a given alphabet with respect to an untagged version, since tagging adds information for synchronization which is not part of the original serial number information. According to the two tagging examples above, for a total of M serial numbers, and an alphabet of cardinality N, one obtains the following code length L values:

Type-1 tagging: Insertion of a delimiter symbol:

$$L=\text{ceil}(\log_N(M))+1,$$

Type-2 tagging: Use of two distinct alphabet subsets of cardinality N/2 each (let N be even), one for the first symbol and the other one for the remaining symbols:

$$\text{ceil}(\log_{N/2}(M))$$

Practically, this increase of L is often of 1 or 2: for example, for an alphabet of 32 different symbols (value called cardinality):

For $M=10^6$ items: L=4 without tagging, L=6 for type-1 tagging and L=5 for type-2 tagging, one would choose the latter to minimize L for item marking.

For $M=10^{11}$: L=8 without tagging, 9 with type-1 tagging, 10 with type-2 tagging, then type-1 is preferable.

For an alphabet of cardinality 40:

For $M=10^{11}$: L=7 without tagging, 8 with type-1 tagging, and 9 with type-2 tagging, thus type-1 tagging is the best.

As for Method 1, each symbol of a code should be given a graphical representation before marking a physical item, such as any human readable character, graphical symbol, or a barcode-like machine-readable symbol, in monochrome or in color.

Figure 9:
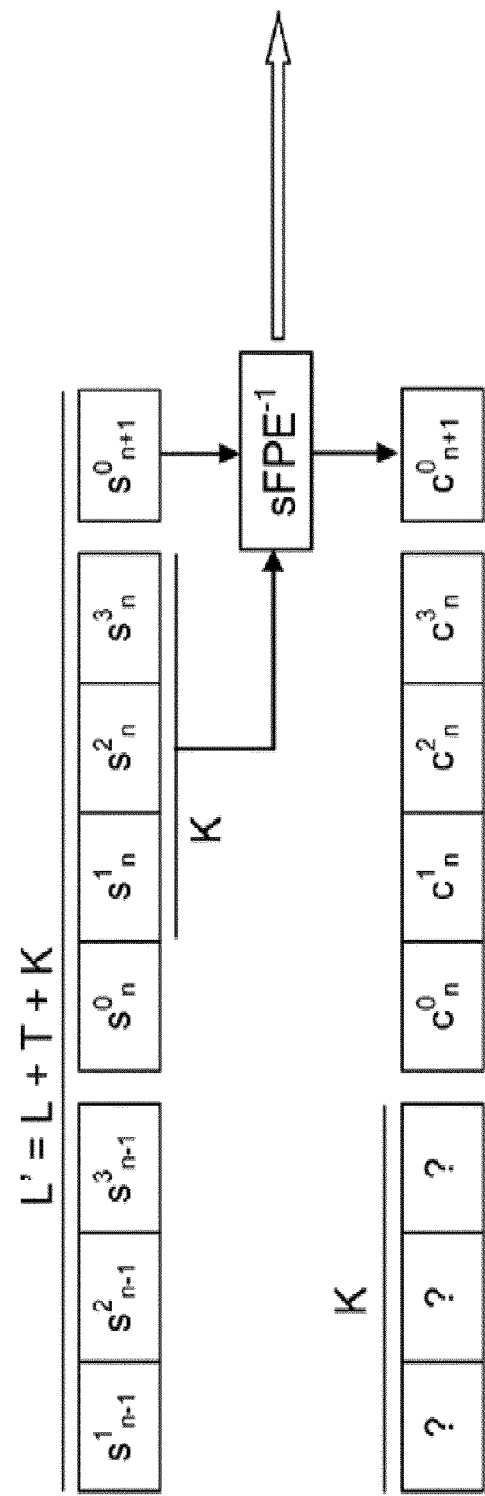
FIG. 9 illustrates an example of a stream cipher serialization decrypting of characters.

Regarding serial number decoding aspect, the serial number decoding according to Method 2 is depicted on FIG. 9. As for Method 1, an actual serial number can be decoded from the L'-length concatenation string read from items. But unlike method 1, decryption always outputs correctly decoded symbols but only after the K first symbols within the processed L'-length concatenation strings.

Consequently, only symbols from position K up to the last position (L'−1) of the concatenation string can be decrypted accurately. Ignoring the K first non-decrypted symbols (denoted as "?" on the figure) after decryption, one gets a string of length (L'−K) of correctly decrypted symbols. Thus, in general a string of length (L'−K)=(L+T) of correctly decrypted symbols is obtained, with T≥0 being the number of extra symbols. However, these symbols may still be desynchronized. One does not know yet the correct synchronization, i.e. the actual offset position of the L-length code within this decrypted concatenation string. Therefore, further synchronization techniques are needed after decryption.

Decrypting of a concatenation string is done as follows:
Decrypt the L'-length concatenation string using sFPE decryption key k', resulting into a (L'−K) or (L+T)-length decrypted concatenation string. Accordingly, with respect to the described encryption stage, a symbol can be decrypted by subtracting the output of the encrypting function from the input symbol modulo the cardinality N of the corresponding alphabet. The process works as follows:

Decrypt sequentially each concatenation string symbol from offset position K and preferably to offset (L'−1) to take advantage of the T extra symbols if any, or at least to offset (L+K−1). For each symbol decryption, use for feedback the K first symbols of the encrypted concatenation string;

Symbols at offsets from 0 to (K−1) (indicated with "?") cannot be decrypted because feedback encrypted symbols are not available for them: therefore, they are ignored in the resulting (L'−K)-length decrypted concatenation string.

The resulting (L'−K)-length string is a string of accurately decoded symbols of length (L+T) with T≥0. It either contains a complete L-length formatted serial number, or two possibly incomplete parts of consecutive formatted serial numbers.

Synchronization should be determined order to reconstruct the original serial number, i.e. one should find the boundary between two code parts within the decrypted concatenation string. One can distinguish the following two cases: Case 1 wherein no additional synchronization tagging is present; Case 2 wherein synchronization tagging is present. And for these two cases, either T=0, or T>0, reminding that:

Concatenation strings are of length: L'=(L+T+K) with T≥0 and K>0;

Decrypted concatenation strings are of length: (L'−K)= (L+T) and may be desynchronized.

Accordingly, the synchronization steps comprise:

Case 1: No Synchronization Tagging is Present:

Sub-case 1.a: for a L-length decrypted synchronization string (i.e. T=0, or only the L first correctly decoded symbols have been retained): extracting L-length formatted serial number candidates starting at offset positions from 0 to (L−1) unfortunately results into as many ambiguities! This is because any offset-shifted formatted serial number candidate n is equal to some valid 0-offset-shifted formatted serial number n' somewhere else in the space formed by the M possible serial numbers. And no tagging implies that no synchronization information is available to indicate the actual code offset. Consequently, this sub-case 1.a is not applicable in this Case 1 and must be discarded.

Sub-case 1.b: a (L+1)-length to (2L−1)-length decrypted synchronization string (i.e. 0<T<L) is available with strictly more than L correct symbols. In order to verify it, one can validate each offset-shifted L-length formatted serial number candidate with the remaining symbols. This is done similarly as in Method 1 by matching n−1 and n+1 calculated from n, symbol-by-symbol in formatted form, but with the difference that no decryption/encryption is needed (symbols are already decrypted). This is like the case L<L'≤(2L−1) of Method 1. Ambiguities may still appear for some offset positions, but their occurrence reduces as T increases: concatenation strings of length L' should then be reasonably close to (2L+K) (or T reasonably close to L) to achieve a practically low probability of ambiguities.

Sub-case 1.c: a (2L+K)-length concatenation string, or 2L-length decrypted concatenation string, or longer, is available, implying T≥L: one can validate each offset-shifted L-length formatted serial number as above. This is like the case L'>2L−1 of Method 1. However, in this sub-case ambiguities can be eliminated because one and only one valid candidate n is consistent with the pair (n−1, n) or the pair (n, n+1): this can be checked since one has 2L valid symbols. Moreover, with more than 2L correctly decrypted symbols, it is even possible to detect if input concatenation string had errors by checking decoded symbols with more occurrences of serial numbers like (n−2), (n+2), etc.

Case 2: Synchronization Tagging is Present:

Once decrypted, each (L'−K) or (L+T)−length correctly decrypted concatenation string contains the tagging used for encryption. From the non-exhaustive examples of Type-1 and Type-2 tagging given while describing the encoding, decrypted tagging comprises:

Type-1 tagging: The delimiter symbol inserted at the beginning of each formatted serial number.

Type-2 tagging: The symbol from one of the alphabet subset indicating that it is the first symbol of a formatted serial number, the other symbols coming from the complementary alphabet subset.

The correct offset position can then be deduced from tagging. Moreover, it is possible to:

First verify the consistency or tagging to detect erroneous inputs, and reject the decoding in case of error. For example, by checking that:

Delimiter symbols are separated by exactly L positions;

First symbols are separated by exactly L positions;

Then re-synchronize the decrypted concatenation string, remove tagging, and reform the proper serial number n.

Considering sub-cases as in Case 1 above one has:

Sub-case 2a: a L-length decrypted concatenation string is available (or T=0): it is re-synchronized, tagging is removed, and serial number n is reformed knowing that the expected serial number sequence is (n−1), n, (n+1).

Sub-case 2.b: L'=(L+T+K) with T>0: it is re-synchronized thanks to tagging, and extra symbols can be used to match the resulting symbols to ensure that the serial number n could be correctly decoded, knowing that the expected sequence is (n−1), n, (n+1). With more extra symbols T, it becomes even possible to check more symbols, to possibly include (n−2), (n+2) or more in the check. Thus, it becomes easier the detect if input concatenation string was wrong and reject the decoding, as for Case 1, sub-case 1.c above.

For sub-case 2.b, since the comparisons of decrypted concatenation strings is easier to perform in the formatted domain rather than directly with binary serial numbers n (although this is not excluded), this can be done as follows:

Do calculations in the formatted domain using the corresponding base (symbols C'), rather than in the serial number domain (n), but with synchronization tagging removed if present;

Previous part and following part of the decrypted concatenation string have to be re-concatenated in the correct order, by adding 1 to the previous one since the previous one corresponds to serial number n−1 and the current one is n, or subtracting 1 from the next serial number since it is n+1, to restore a proper L-length unencrypted code; this reconstructed formatted serial number is known to be correct, thanks to the capability of sFPE to output correctly decrypted values;

Finally, this reconstructed formatted serial number can be un-formatted to get the actual serial number n.

For both sub-cases above, one can still reduce ambiguities using side information, for example:

The expected batch range to check against decoded n: a start n1 and an end n2 serial numbers, checking that n is such that n1≤n≤n2.

The stored initialization vectors (IVs) and resulting intermediate code values stored for each batch as explained in the above discussion on initialization vectors.

Regarding the feedback length K:

The feedback length K can be small, such that K≤L. However, it should be reasonably large enough, i.e. close to L especially if L is small. Feedback length K defines, with the alphabet cardinality N, the variability V of encryption (i.e. the number of possible different encryptions) for a given encryption key k: $V=N^K$.

An attacker should not be able to guess a valid feedback string easily. On the other hand, there is no upper bound for K, but probably a value of K significantly larger than L would not bring so much additional security. It is proposed that the variability V should be at least several millions to achieve good security, limiting the effectiveness of brute-force approaches for attacking the serialization.

For example, for an alphabet cardinality of 32, one can propose K=L or (L−1) for small values of L such as 6, and K fixed to 6 for larger L values. For an alphabet cardinality N=32, K=4 ensure a variability of encryption V=1 million, and K=6 achieves V=1 billion.

The present invention targets principally human readable serialization, with the user potentially typing and querying the code manually. However, the techniques described in this document are not restricted to human-readable coding only and can address machine readable coding too. Coding may comprise:

human readable coding, using Latin alphabet, Cyrillic alphabet, Asiatic alphabet, or any other alphabet;

human readable coding but optimized for machine reading using special polices and fonts, like (but not limited to) OCRA for optical character recognition;

a machine readable-only code that can be printed linearly, for example (but not limited to):

sequence of very small 1D/2D barcodes;

Intelligent Mail barcode (IM) barcodes used for postal applications, or similar;

proprietary coding made of small graphical elements, each representing an alphabet symbol and printed linearly.

FIG. 10 shows an example of a proprietary barcode/symbology, made of mini 1D/2D patterns printed linearly, each pattern representing a symbol of the alphabet.

Markings can be realized in the form of:

direct coding using continuous inkjet, laser engraving, or any other techniques allowing direct coding;

pre-coding on a tape that can be later cut and pasted on items, without guarantee of registration.

Figure 11:
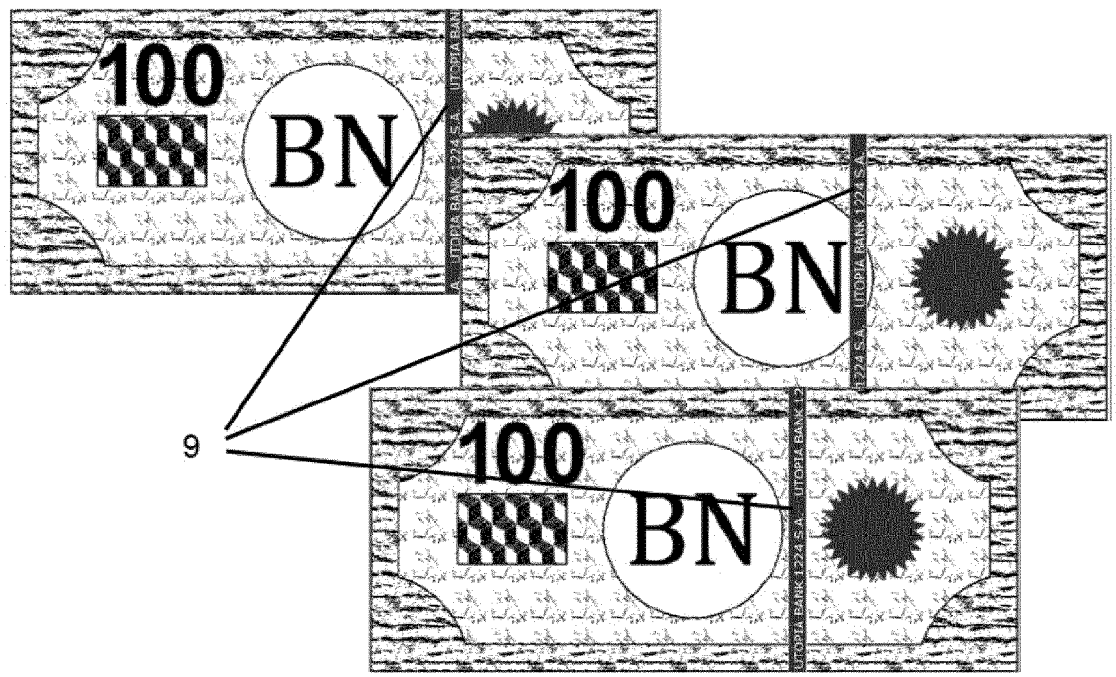
FIG. 11 illustrates conventional security threads integrated into banknotes of many countries, showing desynchronization of their inscription along their length and varying lateral positioning.
Figure 12:
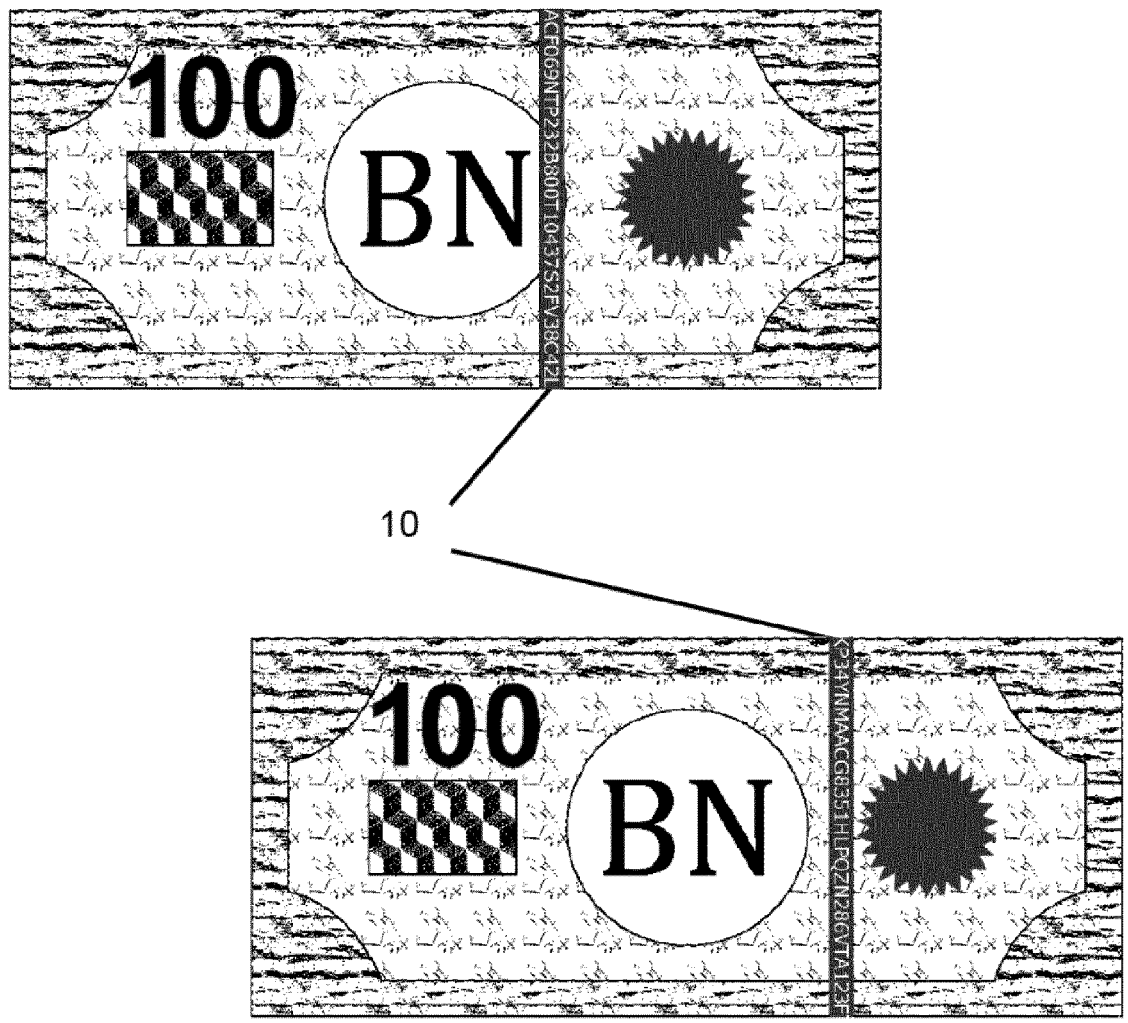
FIG. 12 illustrates a security thread marked with the linear desynchronization-resilient serialization, which can be used as an additional authentication feature of banknotes.

Serialization according to the invention can be applied in every situation where registration is difficult due to various reasons, such as high speeds of the moving items, absence of sophisticated registration mechanisms, or the mechanical impossibility of registration. Security threads 9 incorporated in banknotes, as illustrated on FIG. 11, is a good example where such serialization can be used. The serialization method disclosed in this invention would reliably mark such threads 10 regardless their mis-registration, as shown in FIG. 12, and can be even used for machine reading. The method allows reducing (to zero) the probability of decrypting errors, achieving proper authentication/identification. It is suitable for any coding or marking that can be arranged linearly as a continuous string.

The above disclosed subject matter is to be considered illustrative, and not restrictive, and serves to provide a better understanding of the invention defined by the independent claims.

The invention claimed is:

1. A method for serialization of physical items by means of a system comprising a memory, a processor and a marking device connected to the processor, comprising:

encrypting, using the memory together with the processor, a unique serial number of each physical item using encryption key k stored in the memory to obtain a corresponding unique code, and marking, using the marking device, each physical item with its corresponding unique code received from the processor, wherein each unique code has a length L and is included into a string of symbols having a length L' that is marked on the corresponding physical item, wherein L' is larger than L, and wherein the string of symbols further includes at least a part of a unique code obtained from encrypting a preceding unique serial number and/or at least a part of a unique code obtained from encrypting a next unique serial number, wherein in the string of symbols the unique code corresponding to the item is concatenated ahead with the end of the unique code obtained from encrypting the preceding unique serial number and/or concatenated after with the beginning of the unique code obtained from encrypting the next unique serial number, wherein encrypting a serial number of an item to obtain a unique code is performed by self-synchronizing feedback-based stream encryption wherein symbols of the serial numbers are encrypted one-by-one, in a stream-cipher construction with format preserving encryption (FPE).

2. The method according to claim 1, wherein the symbols of the string of symbols comprise graphical symbols, selected from human readable characters and machine-readable symbols.

3. The method according to claim 2, wherein the symbols of the string of symbols are selected from a set of glyphs.

4. The method according to claim 3, wherein the symbols of the string of symbols are alphabetical, alphanumerical or numerical symbols.

5. The method according to claim 1, wherein the unique code is present in the string of symbols at an offset, wherein L' is larger than or equal to (2L−1).

6. The method according to claim 5, wherein the offset of the unique code in the string of symbols is denoted by applying different alphabets for different positions of the symbols in the unique code, or by applying a marking between consecutive unique codes, wherein the marking is selected from a spacing, special sign or a box.

7. The method according to claim 1, wherein the unique code is present in the string of symbols at an offset, wherein L' is smaller than (2L−1).

8. The method according to claim 7, wherein the offset of the unique code in the string of symbols is denoted by applying different alphabets for different positions of the symbols in the unique code, or by applying a marking between consecutive unique codes, wherein the marking is selected from a spacing, special sign or a box.

9. The method according to claim 1, wherein marking the strings of symbols on the items comprises direct marking or printing, applying pre-printed labels, or laser engraving.

10. A decryption method for recovering a unique code and corresponding serial number from a string of symbols marked on a physical item according to the method of serialization of claim 1, comprising:

reading the string of symbols of length L' marked on the physical item;

decrypting, based on a decryption key k', blocks of symbols of length L with offsets from 0 to L−1 within the string of symbols of length L' read on the item, with L' larger than L;

for each serial number candidate n to correspond to a block of length L, calculating a preceding serial number n−1 and a next serial number n+1;

encrypting with encryption key k the serial numbers n−1 and n+1 respectively, obtaining respectively preceding and next serial number candidates;

comparing symbol-by-symbol symbols of the preceding serial number candidate with the corresponding symbols of the string of symbols of length L' left before a currently tried offset position, if any, and symbols of the next serial number candidate with the corresponding symbols of the string of symbols of length L' right starting from the currently tried offset+L, if any, wherein if all compared symbols match, the correct unique code and the corresponding correct serial number n are recovered from the read string of symbols; and if at least one comparison of symbols fails for the offset, no serial number corresponds to said offset.

11. The method according to claim 1, wherein a minimum length L' of the string of symbols marked on an item, is equal to (L+K), K being a feedback length comprising several characters or at least one symbol in addition to said length L of unique code.

12. A system for serialization of physical items, comprising:

a memory and a processor, the memory together with the processor are configured to cause the system to encrypt a serial number of each physical item using an encryption key k stored in the memory to obtain corresponding unique codes, and a marking device connected to the processor and adapted to mark the unique codes received from the processor on the physical items, wherein the system is configured to include each unique code having a length L into a string of symbols having a length L', wherein L' is larger than L, and wherein the string of symbols further includes at least a part of a unique code obtained from encrypting a preceding unique serial number and/or at least a part of a unique code obtained from encrypting a next unique serial number, and mark the string of symbols on a corresponding item, wherein in the string of symbols the unique code corresponding to the item is concatenated ahead with the end of the unique code obtained from encrypting the preceding unique serial number and/or concatenated after with the beginning of the unique code obtained from encrypting the next unique serial number, wherein the memory together with the processor are configured to cause the system to apply Format Preserving Encryption (FPE), wherein ciphers of the serial numbers are encrypted one-by-one, in a stream-cipher construction.

13. A system for recovering a unique code and corresponding serial number from a string of symbols marked on a physical item by a system for serialization of items according to claim 12, the system comprising a processing unit equipped with a memory unit, and a reader, wherein the reader is adapted to read a string of symbols marked on a physical item and store the read string of symbols in the memory unit, and the processing unit is configured to cause the system to perform the operations of:

decrypting, based on a decryption key k' stored in the memory unit, blocks of symbols of length L with offsets from 0 to L−1 within the string of symbols of length L' stored in the memory unit, with L' larger than L;

calculating, for each serial number candidate n to correspond to a block of length L, a preceding serial number n−1 and a next serial number n+1;

encrypting with encryption key k the serial numbers n−1 and n+1 respectively, and obtaining respectively preceding and next serial number candidates;

comparing symbol-by-symbol symbols the preceding serial number candidate with the corresponding symbols of the string of symbols of length L', left before a currently tried offset position, if any, and symbols of the next serial number candidate with the corresponding symbols of the string of symbols of length L', right starting from the currently tried offset+L, if any wherein if all compared symbols match, the system is adapted to deliver a signal indicating that the correct unique code and the corresponding correct serial number n are recovered from the read string of symbols; and if at least one comparison of symbols fails for the offset, no serial number corresponds to said offset.

\* \* \* \* \*